ized at various temperatures with stoichiometric
2,809,881
Patented Oct. 15, 1957

2,809,881
PROCESSES FOR THE CATALYTIC PURIFICATION OF OXYGEN EMPLOYING $O_3$

Aristid V. Grosse, Haverford, and Edward A. Nodiff, Philadelphia, Pa., assignors to The Welsbach Corporation, Philadelphia, Pa., a corporation of Delaware No Drawing. Application December 20, 1954,
Serial No. 476,591

1 Claim. (Cl. 23—221)

This invention relates to the catalytic purification of oxygen and more particularly to processes for the catalytic purification of oxygen utilizing $O_3$ to increase the efficiency of combustion at lower temperatures.

In the copending application of Aristid V. Grosse and Edward A. Nodiff, entitled "Processes for the Catalytic Purification of Oxygen and Catalysts Therefor," Serial No. 476,261, filed December 20, 1954, processes are described for the catalytic purification of oxygen and suitable catalysts are described for use in such processes. The processes there described employ temperatures ranging from 200° C. to red heat with certain described catalysts for reducing the combustible impurities in the oxygen to water and carbon dioxide.

The catalytic processes utilizing the described catalysts of our copending application operate at very close to 100% efficiency at temperatures above 200° C. but the efficiency of the processes drops rapidly as the temperatures decrease below 200° C. so that, at 175° C., combustion efficiency may be as low as 1%.

We have found most unexpectedly that by adding ozone to the oxygen stream before passing it over the catalysts in the processes of our application referred to above that the temperature for complete combustion of the contaminants is lowered by at least 150° C. This was surprising inasmuch as nothing but catalytic decomposition of the ozone was anticipated. This unexpected result has important commercial advantages, among others, in the purification of oxygen before admission to an ozonator in that the efficiency of the ozonator is increased and the cost of purifying the oxygen is markedly reduced.

It is accordingly an object of the present invention to provide novel processes for the catalytic purification of oxygen contaminated with combustible contaminants employing $O_3$ wherein the $O_3$ is introduced into the stream of oxygen before admission to the catalysts to increase the efficiency of the catalytic purification and to substantially lower the temperatures at which catalytic purification occurs.

Another object of the present invention is to provide such processes in which approximately stoichiometric amounts of ozone based upon the amounts of combustible impurities present in the oxygen stream are employed to reduce the temperature at which catalytic purification of the oxygen takes place.

Other and further objects of the present invention will appear from the following description of an illustrative embodiment thereof.

The illustrative embodiment of the present invention described hereinafter is detailed for purposes of illustrating the present invention and should in no way be construed as defining or limiting the same, reference being had to the appended claim to determine the scope of the invention.

In our copending application referred to above we have described various supported transition metals and metal oxide catalysts which are suitable for converting the combustible impurities in oxygen to water and carbon dioxide. Among such suitable catalysts there described is an alumina supported mixture of $Cr_2O_3$, $Mn_2O_3$, and CuO. If butyric acid is added to the oxygen to illustrate the catalytic reaction taking place in the conversion of the impurities and $O_3$ is added to the oxygen before admission to the catalysts then the following reaction takes place if stoichiometric amounts of ozone are employed:

$$C_3H_7COOH + 10O_3 \rightarrow 4CO_2 + 4H_2O + 10O_2$$

and complete combustion of the impurities is obtained at approximately 140° C.

For instance, in an experiment with oxygen contaminated with 1500 p. p. m. of butyric acid, adding roughly stoichiometric amounts of $O_3$ to the oxygen stream before admitting it to the catalytic chamber, it was found that all the butyric acid was converted to water and carbon dioxide at 140° C. Temperatures lower than 140° C. could not be reached in this case because of the heat of reaction.

In another experiment, in which the concentration of butyric acid was 100 p. p. m. and the gaseous hourly space velocity was 6000 v./v./hr., still lower temperatures were reached. This gaseous mixture was then catalized at various temperatures with stoichiometric amounts of $O_3$ added before catalytic combustion of the impurities and the following results were obtained:

Table I
COMBUSTION EFFICIENCY WITH DECREASING TEMPERATURE USING STOICHIOMETRIC QUANTITIES OF $O_3$

[$O_2$ rate=6000 v./v./hr.; 100 p. p. m. butyric acid.]

| Temperature, ° C. | Combustion Efficiency, Percent |
|---|---|
| 300 | 100 |
| 175 | 100 |
| 100 | 70 |
| 40 | 50 |

In Table I the combustion efficiency referred to is the percent of contaminant oxidized to $CO_2$ and $H_2O$.

It should be noted that combustion efficiency would be about 1% if no ozone is used but that at the same temperature (175° C.) with half the stoichiometric amount of ozone combustion efficiency is approximately 50%. It should also be noted that, where ozone is added, a reasonable combustion efficiency, 50%, is obtained even though the temperature is reduced to 40° C. (see Table I).

The same order of unexpected results were obtained when acetaldehyde was added to the oxygen as a contaminant to illustrate the combustion efficiency obtained by introducing ozone into the oxygen stream before admission to the catalysts generally described above. The following table describes the results of tests showing combustion efficiency at various temperatures:

Table II
COMBUSTION EFFICIENCY WITH DECREASING TEMPERATURE AND VARIOUS PERCENTAGES OF OZONE

[$O_2$ rate=6000 v./v./hr.; 1000 p. p. m. acetaldehyde.]

| Temperature, ° C. | Percent of Stoichiometric Amount of Ozone Added to Gas Stream | Combustion Efficiency, Percent |
|---|---|---|
| 180 | 100 | 93 |
| 180 | 50 | 39 |
| 180 | 33 | 15 |
| 180 | 0 | 4 |
| 90 | 100 | 70 |

The equation for the reaction between $CH_3CHO$ and $O_3$ is represented by $$CH_3CHO + 5O_3 \rightarrow 2CO_2 + 2H_2O + 5O_2$$

The processes of the present invention apply with equal effectiveness to concentrations of contaminants ranging from 0 to at least 1500 p. p. m. by volume and are not limited to use with butyric acid or acetaldehyde. Amounts of ozone larger than stoichiometric show the same improved and unexpected results as stoichiometric quantities. The present invention is not limited to the use of stoichiometric quantities of $O_3$. Various catalysts other than the catalyst referred to above may be employed when $O_3$ is utilized to reduce temperatures and improve combustion efficiency. Such catalysts fall within the general definition of supported metal oxide mixtures or supported transition metals as generally described in our application referred to above.

It should now be apparent that by the present invention we have provided novel processes for the catalytic purification of oxygen employing $O_3$ which in every way satisfy the several objectives described above.

Changes in or modifications to the illustrative processes herein detailed may now be suggested to those skilled in the art without departing from the present inventive concept and reference should therefore be had to the appended claim to determine the scope of the invention.

What is claimed is:

In a process for the catalytic purification of oxygen having combustible impurities therein to convert the combustible impurities therein to carbon dioxide and water the steps of mixing not less than approximately the amounts of $O_3$ to the oxygen required to oxidize the combustible impurities present, subjecting the oxygen and $O_3$ mixture to catalytic purification in the presence of a supported oxidizing metal catalyst at velocities of approximately 6,000 v./v./hr. and controlling the temperature of combustion in the range of approximately 40° C. to approximately 200° C.

References Cited in the file of this patent

UNITED STATES PATENTS

| | | |
|---|---|---|
| 984,221 | Hornstobel | Feb. 14, 1911 |
| 1,961,878 | Gilkey | June 5, 1934 |
| 2,203,188 | Beer | June 4, 1940 |
| 2,582,885 | Rosenblatt | Jan. 15, 1952 |
| 2,700,648 | Thorp | Jan. 25, 1955 |

FOREIGN PATENTS

| | | |
|---|---|---|
| 15,175 | Great Britain | 1886 |